United States Patent [19]

Thomas, Jr.

[11] Patent Number: 4,852,197
[45] Date of Patent: Aug. 1, 1989

[54] APPARATUS FOR TRAFFICKING PEOPLE THROUGH AIRPORTS OR LIKE TRANSIT TERMINALS

[76] Inventor: Joseph R. Thomas, Jr., 4606 Baycrest Dr., Tampa, Fla. 33615

[21] Appl. No.: 166,684

[22] Filed: Mar. 11, 1988

[51] Int. Cl.⁴ ............................................. E01D 1/00
[52] U.S. Cl. ...................................... 14/71.5; 14/71.7
[58] Field of Search ...................... 14/71.5, 71.7, 71.3, 14/71.1, 69.5, 1; 104/18, 20, 27, 28, 30, 31; 52/174, 175, 176

[56] References Cited

U.S. PATENT DOCUMENTS

| | | | |
|---|---|---|---|
| 2,581,293 | 1/1952 | Read et al. | 14/71.5 |
| 3,521,316 | 7/1970 | Adams et al. | 14/71.5 |
| 3,808,626 | 5/1974 | Magill | 14/71.5 |
| 4,318,197 | 3/1982 | Drozd | 14/71.5 |

Primary Examiner—Jerome W. Massie
Assistant Examiner—Matthew Smith
Attorney, Agent, or Firm—Dominik, Stein, Saccocio, Reese, Colitz & Van Der Wall

[57] ABSTRACT

An improved system for facilitating the movement of passengers at a transit terminal comprising a terminal building having a plurality of passenger transfer zones disposed one above the other. Each transfer zone may include a platform with a recessed area at the edge of the building, an airplane positionable at a distance from the building which has a door with a threshold across which passengers may move and an elongated walkway which has a first end and a second end. Positionable with its first end adjacent to the airplane with its second end positionable adjacent to a preselected one of the transfer zones. Each end has a supporting structure therebetween for retaining the supported end at one of a plurality of elevational positions whereby the first end may be placed at a height corresponding to the threshold of the airplane independent of the height of such threshold and the second end may be placed at a height corresponding to one of the transfer zones. This allows for the movement of passengers between the airplane and the transit terminal independent of the height of the threshold of the airplane or the height of the preselected transfer zone.

4 Claims, 5 Drawing Sheets

APPARATUS FOR TRAFFICKING PEOPLE THROUGH AIRPORTS OR LIKE TRANSIT TERMINALS

BACKGROUND OF THE INVENTION

This invention relates to moving people at a transit terminal and, more particularly, to a method and apparatus for trafficking people within and through an airport or like facility by a passenger loading bridge positioned between an aircraft and an airport terminal building with both ends of the passenger loading bridge being elevationally adjustable.

DESCRIPTION OF THE BACKGROUND ART

In the field of trafficking people at an airport, it was initially a common practice to utilize a ladder positionable adjacent to an aircraft so that departing and arriving passengers could move to and from the aircraft by simply walking up and down the ladder. Movement of the passengers would be across the ground surface of the airport between the ladder and a one story terminal building.

Subsequently, passenger loading bridges were developed to constitute a walkway between an elevated door of the aircraft and an elevated location of a multi-story terminal building. The end of the passenger loading bridge adjacent to the aircraft was of a variable height to facilitate its use with different sizes of aircraft with different door heights. At the terminal end, however, the passenger loading bridge was of a fixed height. As such, passengers, whether entering or leaving the aircraft, would arrive and depart from the same elevational location of the terminal building.

Whether using ladders or conventional passenger loading bridges, inconvenience and confusion often occurs within the terminal building at the location where passengers arrive from, or depart to, the aircraft. Such inconvenience and confusion is the result of an excessively large number of arriving and departing people moving in various directions. The intermixing of people at such location also amplifies security problems since previously screened and unscreened people are intermixed. Such intermixing further complicates the intended routing of preselected people to and from particular areas such as customs.

Various approaches have been attempted to improve passenger loading bridges in an effort to improve the trafficking of people in and through airport facilities. By way of example, note U.S. Pat. No. 2,581,293 to Read wherein side by side walkways are used on a common passenger loading bridge to allow for movement of people to and from different elevational locations at a terminal building.

U.S. Pat. Nos. 3,263,253 and 3,341,875 to Wollard disclose mechanisms for adjusting the elevational location of one end of a passenger loading bridge while U.S. Pat. Nos. 3,184,772 to Moore and 3,412,412 to Kjerulf disclose mechanisms for adjusting the rotational orientation of a passenger loading bridge at the aircraft end.

The vertical movement of the terminal building end of a passenger loading bridge is disclosed in U.S. Pat. No. Re 26,856 to Riggles. U.S. Pat. Nos. 3,561,030 to Seipos and 4,110,859 to Lichti disclose passenger loading bridges of variable lengths, variable angular orientations and variable heights at their aircraft ends. A passenger loading bridge having its terminal building end at ground level is disclosed in U.S. Pat. No. 4,161,049 to Saunders.

Lastly, more modern passenger loading bridges are disclosed in more recent U.S. Pat. Nos. 4,318,197 and 4,333,194 to Drozd; 4,490,869 to Morin; and 4,559,660 to Lichti as well as in French Pat. No. 1,270,168 to Lichti. These more recent patents disclose various mechanisms to improve the extensibility of passenger loading bridge as well as their positionability at their aircraft ends both horizontally and vertically.

Although many such advances are noteworthy to one extent or another, none achieves the objectives of an optimum passenger loading bridge which combines the benefit of the prior art practices without their shortcomings, i.e., a passenger loading bridge which provides for the efficient trafficking of people in and through an airport or like facility by being of a variable height at both ends, convenient and simple to operate and repair, reliable in operation over an extended life, and economical to both manufacture and maintain.

As illustrated by the great number of prior patents and commercial devices, efforts are continuously being made in an attempt to improve passenger loading bridges and facilitate the trafficking of people through airports or like transit terminals. None of these previous efforts, however, provides the benefits attendant of the present invention. Additionally, prior passenger loading bridges do not suggest the present inventive combination of component elements arranged and configured as disclosed and claimed herein. The present invention achieves its intended purposes, objects and advantages over the prior art devices through a new, useful and unobvious combination of component elements, with the use of a minimum number of functioning parts, at a reasonable cost to manufacture, and by employing only readily available materials.

Therefore, it is an object of this invention to provide an improved system for facilitating the movement of passengers at an airport facility comprising a terminal building having a plurality of passenger transfer zones disposed one above the other at the edge of the building; an aircraft positionable at a distance from the building and having a door with a threshold across which passengers may move; and an elongated walkway having a first end and a second end positionable with its first end adjacent to the aircraft and its second end positionable adjacent to a preselected one of the transfer zones. Each end has a supporting structure therebeneath for retaining each supported end at one of the plurality of elevational positions. The first end may be placed at a height corresponding to the threshold of the aircraft independent of the height of such threshold. The second end may be placed at a height corresponding to one of the transfer zones to allow for the movement of passengers between the aircraft and the terminal building independent of the height of the threshold of the aircraft or the height of the preselected transfer zone.

It is another object of the invention to move people more efficiently within and through a transit terminal such as an airport.

It is a further object of this invention to traffic people through an airport facility via a passenger loading bridge which allows for passengers to enter and leave the passenger loading bridge at different elevational locations at the terminal building as well as at the aircraft.

Lastly, it is an object of the present invention to improve supporting structures for the terminal end of a passenger loading bridge to facilitate its raising and lowering to different elevational locations.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purpose of summarizing the invention, the invention may be incorporated into an improved system for facilitating the movement of passengers at an airport facility comprising (1) a terminal building having a plurality of passenger transfer zones disposed one above the other, each transfer zone located at the edge of the building (2) an aircraft is positionable at a distance from the building and having a door with a threshold across which passengers may move and (3) an elongated walkway having a first end and a second end positionable with its first end adjacent to the aircraft and its second end positionable adjacent to a preselected one of the transfer zones. Each end has a supporting structure therebeneath for retaining each supported end at one of the plurality of elevational positions. The first end may be placed at a height corresponding to the threshold of the aircraft independent of the height of such threshold. The second end may be placed at a height corresponding to one of the transfer zones to allow for that movement of passengers between the aircraft and the terminal building independent of the height of the threshold of the aircraft or the height of the preselected transfer zone.

The walkway is covered and at least one of the ends is a covered vestibule with controls for effecting movement of the walkway. Further, at least one end is a vestibule with a top and side walls in a circular configuration and arranged for blocking the movement of passengers between the walkway and transfer zone to other than a predetermined direction. Each transfer zone is at a recess in the floor at the edge of the building with the walkway extending into the recessed area.

The invention may also be incorporated into an improved apparatus to couple one of a plurality of vertically spaced transfer locations at a transit terminal with the door way of an aircraft located thereadjacent. The apparatus comprises a ramp with a first end positionable adjacent to the door of the aircraft and a second end positionable adjacent to a preselected one of the transfer locations of the transit terminal. The apparatus also comprises a first supporting device at the first end of the ramp to vary the elevational position of the ramp to correspond with the height of the door way of the aircraft and a second supporting device at the second end of the ramp to vary the elevational position of the ramp to correspond with the height of a preselected one of the transfer locations.

Lastly, the invention may be incorporated into an improved motion imparting mechanism comprising a plurality of cylindrical members in telescoping relationship with respect to each other, means to effect movement between the members and thereby effect the lengthening and shortening of the mechanism and a motion limiting rings secured to at least a plurality of the members to limit the movement of the members with respect to each other. The rings are of a rigid material secured to the upper exterior edge of a lower member, to the lower interior and upper exterior edges of an intermediate member, and to the lower interior edges of an upper member. The drive means is preferably hydraulic wherein fluid is retained within a plurality of telescoping tubes concentrically located within the members with the rings being of an elastomeric material secured to the upper exterior edge of a lower tube, to the lower interior and upper exterior edges of an intermediate tube, and to the lower interior edge of an upper tube. In the alternative, the drive means may be a jack screw system wherein a motor is supported at the upper extent of the members, a threaded jack screw depending therefrom, a threaded plate secured to the lower member and receiving the jack screw and an aperture beneath the members for receiving the jack screw when the members are in their shortened orientation.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which.

Similar referenced characters refer to similar parts throughout the several Figures.

DETAILED DESCRIPTION OF THE INVENTION

Figure 1:
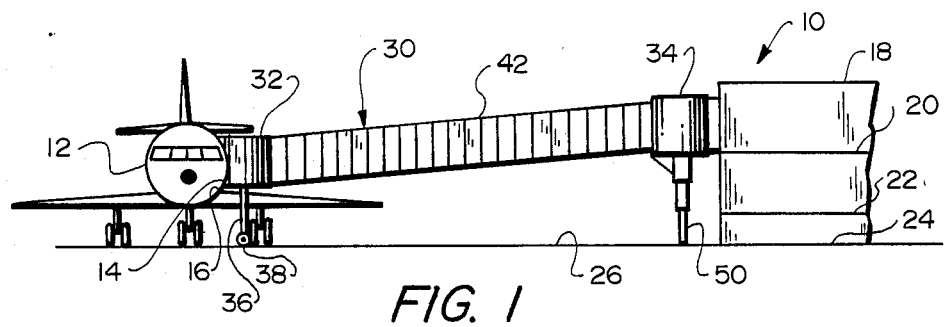
FIG. 1 is a front elevational view of a passenger loading bridge constructed in accordance with the present invention shown in conjunction with an aircraft and an airport terminal building.

With reference to FIG. 1, there is shown an airport facility 10 including an aircraft 12 having a door 14 and a threshold 16 across which passengers may enter or leave the aircraft 12. The door 14 and threshold 16 may be at different elevational locations from ground level as a function of the type of aircraft employed.

Figure 2:
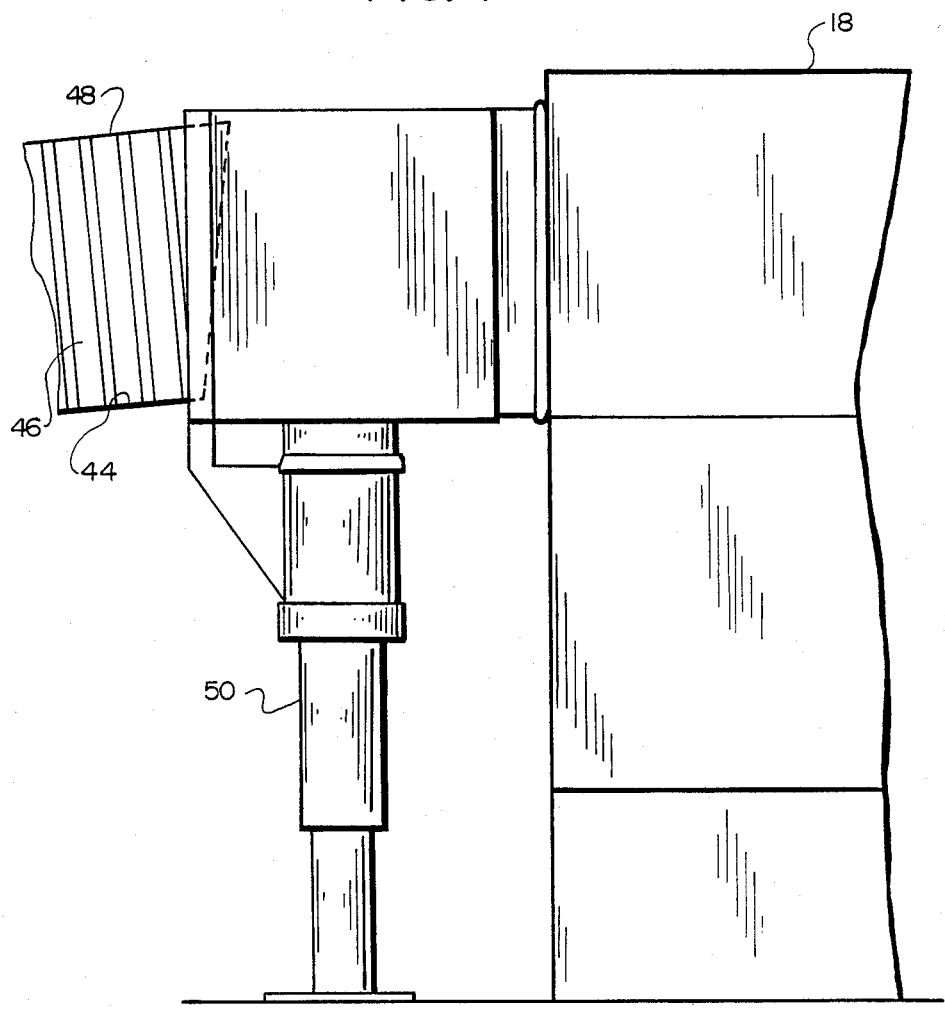
FIG. 2 is an enlarged elevational view of the terminal building end of the passenger loading bridge shown in FIG. 1.
Figure 9:
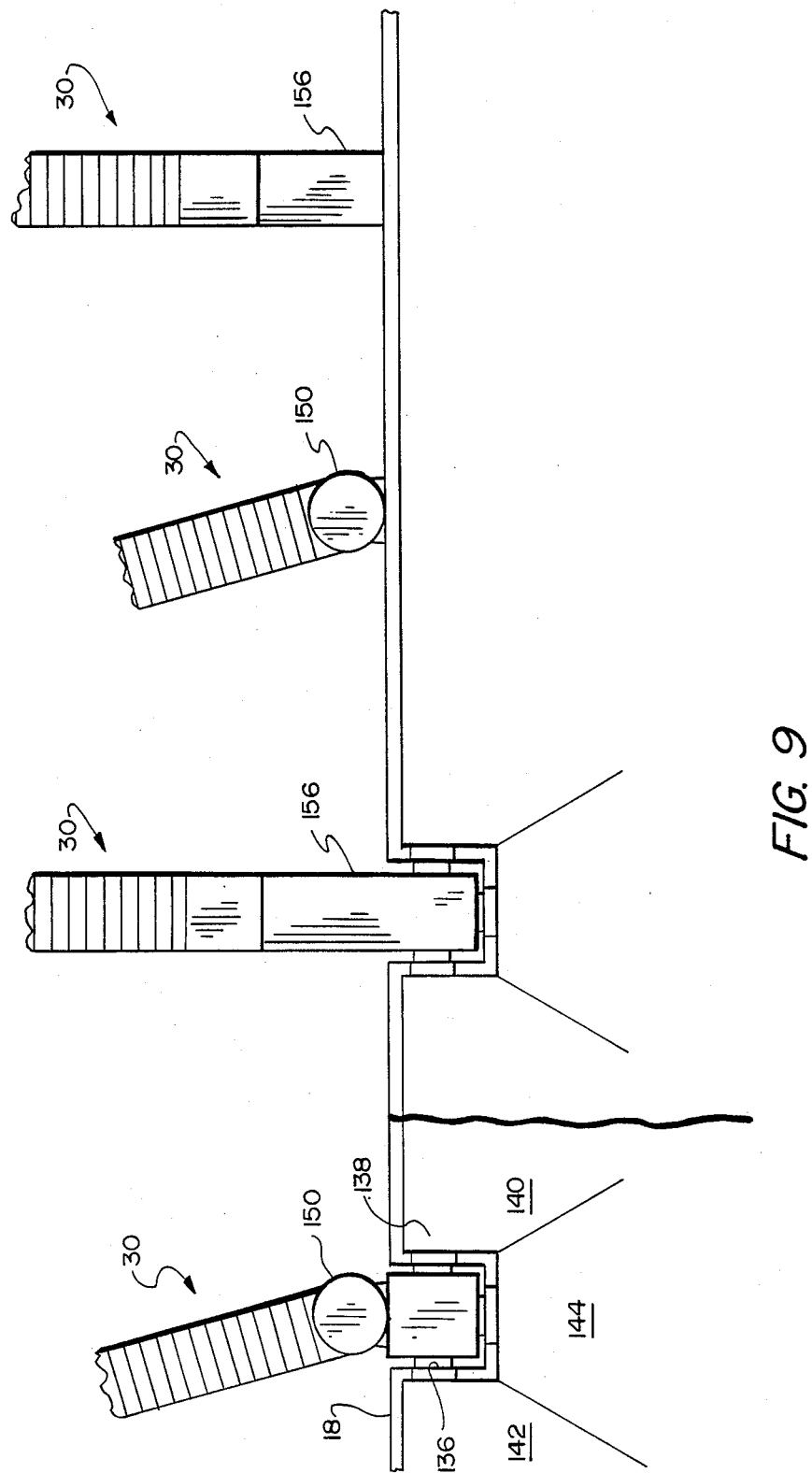
FIG. 9 is a plan view of a portion of the terminal building and the terminal building end of various passenger loading bridges.

Also shown in FIG. 1, as well as in FIGS. 2 and 9, is an aircraft terminal building 18 having passenger loading 20 and unloading floors 22, also at different elevational locations. For example, the upper floor 20 located at about eighteen feet above ground level might be for passengers congregated for entering the aircraft. The lower floor 22, located at about eight feet above ground level, might be for receipt of passengers leaving the aircraft. The lower eight feet constitute a region 24 which is preferably utilized for service personnel and facilities.

Aircraft doors are normally between six (6) feet, nine (9) inches and seventeen (17) feet, six (6) inches from the ground 26 while passenger loading bridges 30 are elevationally extensible at the aircraft end between five (5) feet, six (6) inches and eighteen (18) feet. As such, the floor heights will allow for passenger movement which is always level or down hill and never at more than an 0.83 degrees slope per hundred feet. Such measurements meet the handicap code for invalids.

Located between the aircraft and terminal building is the improved passenger loading bridge 30, commonly referred to as a PLB, having a first or aircraft end 32 and a second or terminal building end 34.

The aircraft end 32 of the PLB 30 is supported by supporting structures 36 or mechanisms adapted to raise and lower the first end of the PLB for accommodating aircraft with their doors at different elevational locations with respect to ground level. The lower most end of the support is provided with wheels 38 to allow movement toward and away from the aircraft. Details of the mechanisms for supporting the aircraft end of a PLB are disclosed in the prior patents as described above. Note in particular the French Patent to Lichti, the subject matter of which is incorporated herein by reference. In association therewith, the first or aircraft end of the PLB is preferably provided with control mechanisms operable from the aircraft end of the PLB for effecting movement both laterally or elevationally.

The central portion 42 of the PLB is preferably extensible along its length between predetermined limits. The extensibility allows for varying distances between aircraft and terminal building. The PLB includes a lower surface, ramp or walkway 44 over which the passengers may walk. Side walls 46 extend upwardly therefrom and a roof 48 protects passengers from the elements. Mechanisms for effecting the extensibility of PLBs are disclosed in the U.S. Patent to Lichti as described above, the subject matter of which is also incorporated herein by reference.

Figure 3:
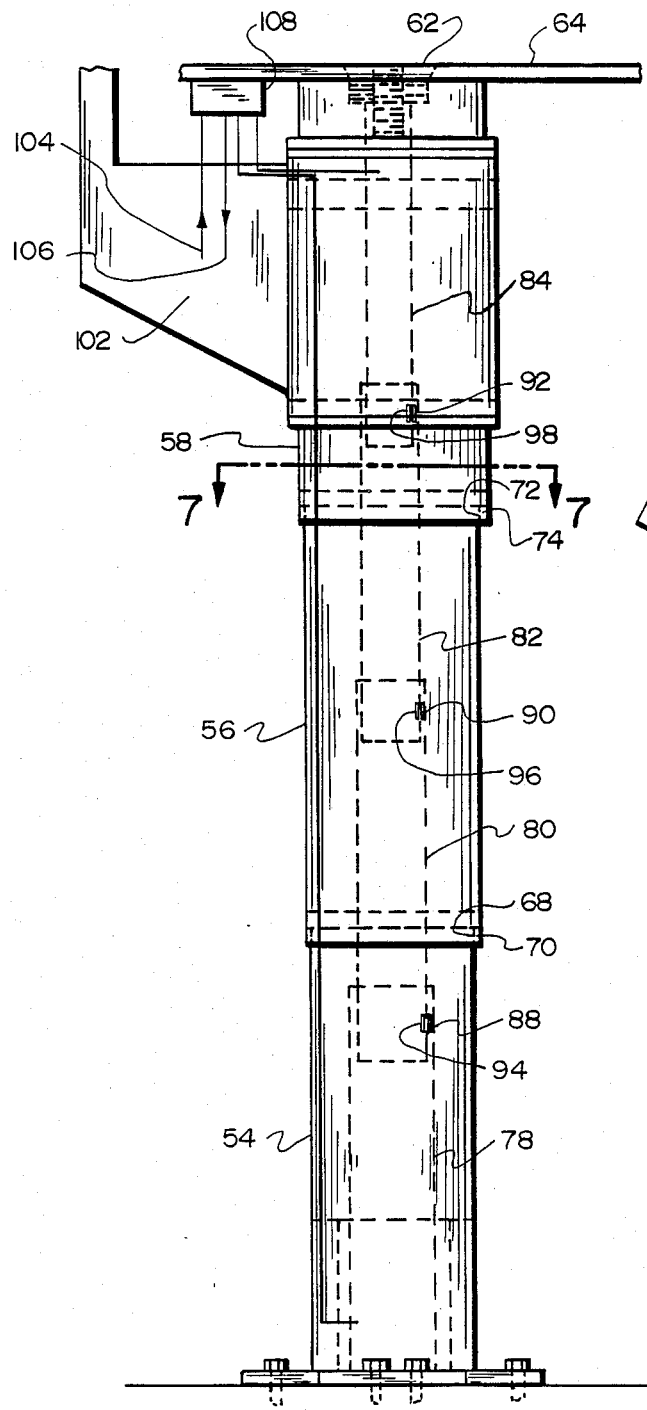
FIG. 3 is an enlarged illustration of the lower or supporting portion of the terminal building end of the passenger loading bridge shown in FIGS. 1 and 2.
Figure 4:
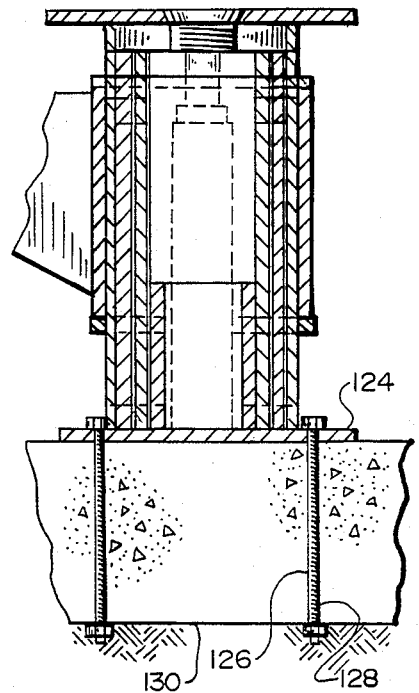
FIG. 4 is a sectional view of the supporting portion or the loading bridge of FIG. 3 but illustrating the lowered or ret position.

In all prior art PLBs, the second end, that end positionable adjacent the terminal building, was of a fixed elevational location. Such second end included a fixed extension or platform and a circular plate in a horizontal plane about which the walkway was rotatable to accommodate the positioning of the aircraft and the loading bridge at different angles with respect to the terminal building. According to the present invention, an improved support mechanism 50 is provided for the second or terminal building end to allow, not only for the rotational reorientating of the PLB with respect to the terminal building, but to allow for varying the elevational location thereof. The support mechanism of the preferred embodiment of the invention can most readily be seen by reference to FIGS. 3 and 4.

According to the preferred embodiment, a plurality of telescoping support sections 54, 56 and 58 are provided to form a lift column. The lift column includes a fixed lower section 54, a vertically reciprocable intermediate section 56 and a vertically reciprocable upper section 58. Secured at the upper edge of the upper section is a circular retainer plate 62 and platform 64 constituting the terminal building end of the ramp of the PLB across which passengers may move between the terminal building and the aircraft. While three such sections are disclosed in the preferred embodiment, it should be understood that any number of reciprocable sections might be employed to allow for different degrees of latitude in the amount of elevation to be afforded to the terminal building end of the PLB. A wide variety of terminal building designs are thus allowed. Further, the present preferred embodiment discloses the cylindrical members as being of a circular cross-sectional configuration. It should be understood, however, that any cylindrical shape might be utilized whether circular, square, rectangular, etc. in cross-sectional configuration.

The sizes of the various sections 54, 56 and 58, one with respect to the other, are such that the smallest in cross-sectional size is the lower section 54 having an exterior diameter substantially equal to the interior diameter of the intermediate section 56. Similarly, the exterior diameter of the intermediate section 56 is of a size slightly smaller than the interior diameter of the upper section 58. In this manner, when the upper section 58 is moved along the length of the intermediate section 56, and when the intermediate section is moved along the length of the lower section 54, lateral support is provided to the support mechanism 50 in all positions of vertical elevation, The upper exterior edge of the lower section 54 is provided with a thin fixed rigid ring 68 constructed of brass or the like cooperable with a similar ring 70 on the lower interior edge of the intermediate section 56. Together the rings define the extent to which the intermediate section 56 may move upwardly with respect to the lower section 54. In a similar manner, the upper exterior edge of the intermediate section 56 is provided with a ring 72 cooperable with a ring 74 on the lower exterior edge of the upper section, again to limit the upward movement of the upper section 58 with respect to the intermediate section 56. The relationship of the plurality of sections and their rings thus defines the extreme upper most extension of the sections with respect to each other and, therefore, the upper limit that the second end of the PLB may rise.

Located within the sections of the support mechanisms, along the entire length thereof, is a plurality of interior tubes 78, 80, 82 and 84 similar to the cylindrical exterior sections 54, 56 and 58 described in the paragraphs hereinabove. The interior tubes, however, are of a smaller cross-sectional size and of a larger number so that the extent of overlap when in the extended position is greater. Rings 88, 90 and 92 are provided on the upper interior edges of the lower three 78, 80 and 82 of the four tubes while co-acting rings 94, 96 and 98 are provided on the lower exterior edges of the upper three tubes 80, 82 and 84. The rings of the interior tubes are preferably formed of an elastomeric material to allow for limited expansion so that the hydraulic fluid within the tubes may be pumped into or extracted therefrom to effect the raising and lowering of the second end 34 of the PLB. By separation of interior and exterior tubes in the hydraulic section, lateral strength is provided by the exterior tubes while the interior tubes allow for the vertical movement of the support mechanisms. Strengthening gussets normally formed on the exterior surface of the lower most exterior cylindrical member may be eliminated.

A source 102 of a motion imparting fluid is located adjacent to the support mechanisms and is coupled by input lines 104 and output lines 106 through a reversible pump 108. An operator controls the pump, preferably from the vestibule thereabove, in the conventional manner to effect the raising and lowering of the second end of the PLB.

Figures 5, 6:
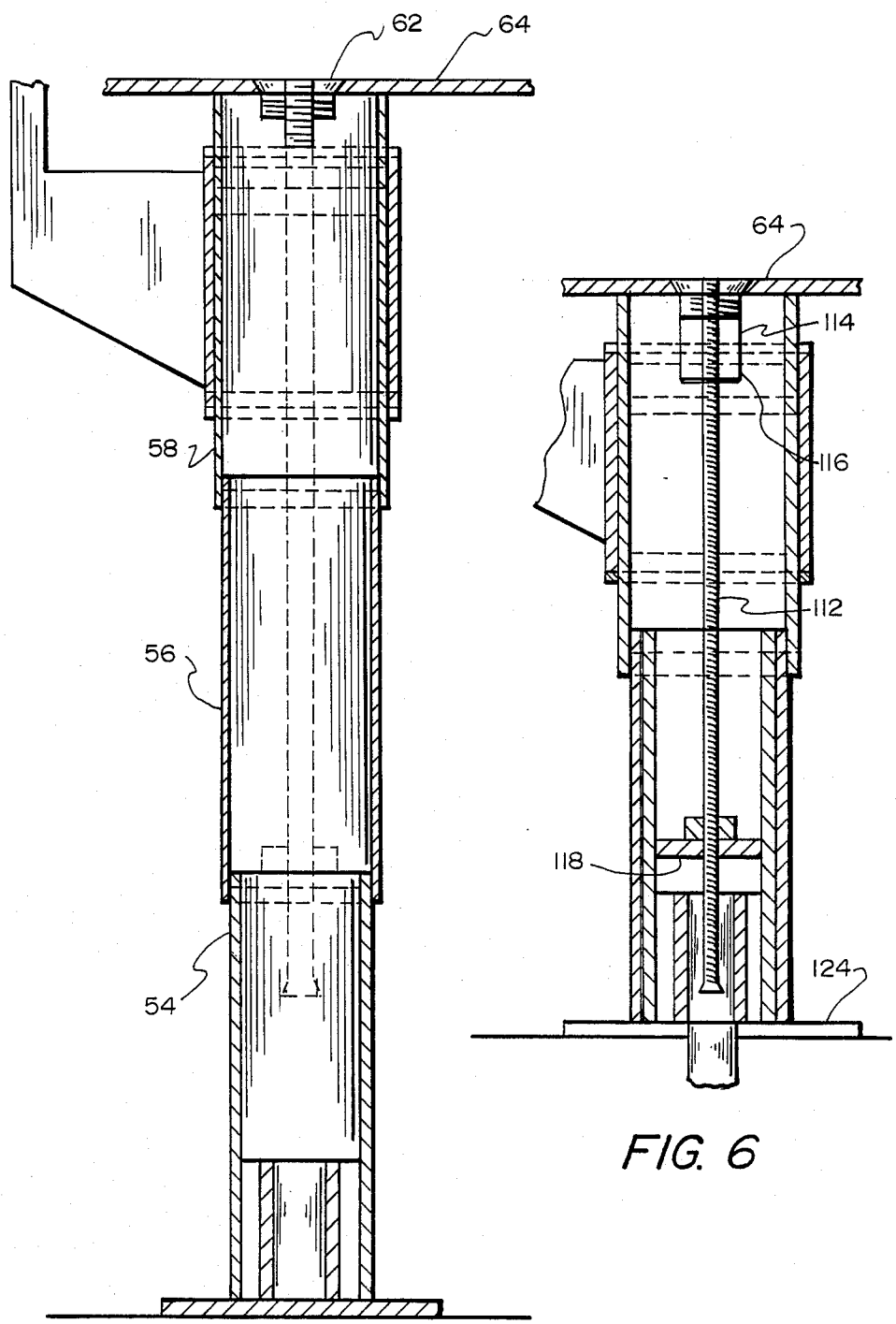
FIG. 5 is a view similar to FIG. 3 showing the lower portion of the terminal building end of the passenger loading bridge but constructed in accordance with an alternate embodiment of the invention.
FIG. 6 is a sectional view of the supporting portion shown in FIG. 5 but illustrating the partially lowered or retracted position.

Shown in FIGS. 5 and 6 is a second or alternate embodiment of the invention. In this second embodiment, a threaded jack screw 112 is employed to effect the movement of the support and thus, the passenger terminal end 34 of the PLB 30. A motor 114 for motion imparting purposes is provided at the upper end of the support mechanisms, secured adjacent to the upper retainer plate 64 through appropriate brackets from which it depends. The motor has, as an extension of its rotor through a gear box 116, the jack screw with threads engagable with threads and ball nut assembly 119 secured to plate 118 secured within the lower section. In this manner rotation of the motor in one direction or the other will rotate the jack screw in an intended direction to thereby raise or lower the upper section 58 appropriately.

The movement of the upper section, when reaching its full elevational height with respect to the intermediate section 56, will then lift the intermediate section to its appropriate height until energization of the motor is ceased. Rotation of the motor in the opposite direction will effect the lowering of the intermediate section and then the upper section in a reverse cycle of operation. The rings 88, 90, 92, 94, 96 and 98 effect the sequence of motion of the cylindrical sections which is the same in both embodiments.

A well or aperture 122 is provided beneath the jack screw to accommodate the jack screw when the second end of the PLB is in its lower most orientation.

The lower end of the lower member is provided with a flange or base plate 124 with apertures 126 through which bolts 128 pass to secure the entire support mechanisms in a pad of concrete 130 in the ground adjacent to the terminal building.

A circular retainer plate 64 includes an access plate 62 over which passengers walk between the PLB 30 and the terminal building 18. The access plate 62 may be secured in position by a plurality of bolts or may be threaded in position within the retainer plate 64 for securement purposes and to allow removal of the access plate from the retainer plate and the remainder of the PLB. This allows for access to the hydraulic area or the motor, gear box or jack screw for repair or replacement purposes.

Figure 7:
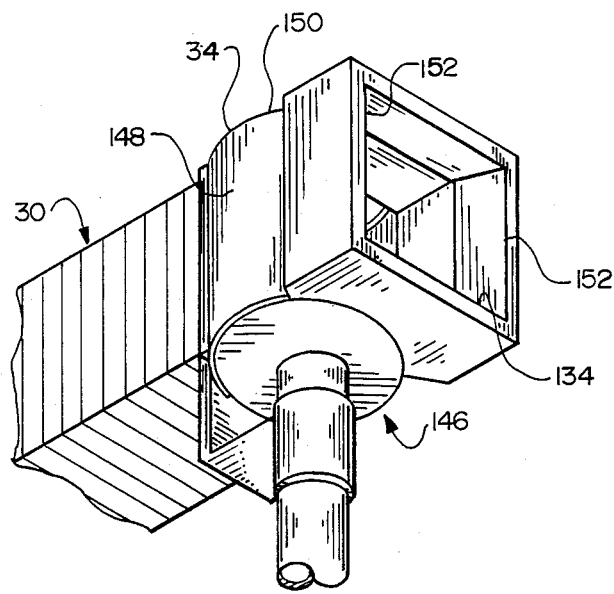
FIG. 7 is a perspective illustration of the terminal end of the passenger loading bridge shown in the previous Figures illustrating a rotatable rotunda.
Figure 8:
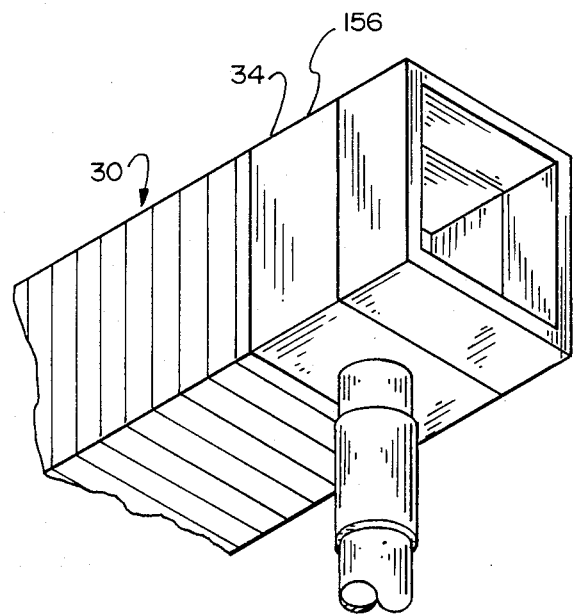
FIG. 8 is a perspective illustration similar to FIG. 7 but the non-rotatable vestibule.

As shown in FIGS. 7, 8 and 9, the passenger terminal end 34 of the PLB 30 is provided with an extension platform or module 134 locatable in a recess 136 of the building floor 138 at the wall of the building 18. By positioning the extension module 134 within the recess of the building at a particular height, passengers entering or leaving the PLB and module may be directed to the left 140, to the right 142 or straight ahead 144 to thereby allow for different rooms or portions of the terminal building to facilitate the separating of passengers in any intended manner during movement to or from the aircraft. Maintaining the segregation of passengers and controlling their trafficking through the transit terminal is thus facilitated and adds to overall convenience and security. The module may, however, terminate flush with the building edge without the recess. Note the PLBs of FIG. 9 which illustrate (3) embodiments of the instant invention.

Lastly, FIGS. 7 and 8 show alternate forms of the second end 34 of the PLB 30. FIG. 7 is the preferred form and illustrates a rotunda 146. A rotunda is an end of a PLB having a circular cross-sectional configuration about which the remainder of the PLB may be rotated. Controls within the rotunda allow for the elevating and lowering of the second end. The lower most portion of the rotunda, its floor, as well as its extension module 134 are fixed with respect to the terminal building. The side walls 148 and roof 150 are jointly rotatable with the walkway of the PLB to effect its desired rotational orientation with respect to the terminal building, module and vestibule. Sliding doors 152 of the conventional elevator type may preferably be provided in pockets of the rotunda to allow or restrict passenger movement. Further details of its rotation may be had by reference to the aforementioned U.S. Patent to Morin. The second end of the PLB may thus be considered an elevating rotunda vestibule or ERV.

The second end of the PLB shown in FIG. 8 is not a rotunda but a simple vestibule 156 at a fixed rotational position with respect to the remainder of the PLB. Such a construction is useful in those situations where the aircraft is at a fixed predetermined position with respect to a terminal building since rotational orientation is not possible.

In either embodiment, additional controls may be employed for the particular application, for example, the end of the PLB adjacent to the terminal may include controls and mechanisms for precisely positioning such end with respect to the terminal building. It should also be understood that while the present invention is described hereinabove as employed in an airport facility, it should be realized that the PLB and/or ERV are readily employed in any like transit terminal, such as a monorail or the like.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,

What is claimed is:

1. A system for facilitating the movement of passengers at an airport facility comprising in combination:
a terminal building having a plurality of passenger transfer zones disposed one above the other, each transfer zone located at the edge of the building;
an aircraft positionable at a distance from the building and having a door with a threshold across which passengers may move; and
a single elongated walkway having a first end and a second end and positionable with its first end adjacent to the aircraft and with its second end positionable adjacent to a preselected one of the transfer zones, each end having a supporting structure therebeneath for retaining the supported end at one of the plurality of elevational positions whereby the first end may be placed at a height corresponding to the threshold of the aircraft independent of the height of such threshold and whereby the second end may be placed at a height corresponding to one of the transfer zones to thereby allow for the movement of passengers between the aircraft and the terminal building independent of the height of the threshold of the aircraft or the height of the preselected transfer zone.

2. The system as set forth in claim 1, wherein the walkway is covered and that least one of the ends is a covered vestibule with controls for effecting movement of the walkway.

3. The system as set forth in claim 1 wherein the second end includes a vestibule with a top and side walls in a circular configuration and arranged for blocking the movement of passengers between the walkway and transfer zone to other than a predetermined direction.

4. The system as set forth in claim 1 wherein each transfer zone is at a recess in the floor at the edge of the building with the walkway extending into the recessed area.

* * * * *